United States Patent [19]

June-Gunn et al.

[11] Patent Number: 5,017,527
[45] Date of Patent: May 21, 1991

[54] MECHANICAL SEALS OF SIC-COATED GRAPHITE BY RATE-CONTROLLED GENERATION OF SIO AND PROCESS THEREFOR

[75] Inventors: Lee June-Gunn; Kim Chang-Sam; Choi Heon-Jin; Park Seong-Hoon, all of Seoul, Rep. of Korea

[73] Assignee: Korea Advanced Institute of Science & Technology, Seoul, Rep. of Korea

[21] Appl. No.: 332,826

[22] Filed: Apr. 3, 1989

[30] Foreign Application Priority Data

Jul. 20, 1988 [KR] Rep. of Korea .............. 88-9033[U]

[51] Int. Cl.$^5$ .................... C04B 35/52; C04B 35/56
[52] U.S. Cl. ........................................ 501/90; 501/97; 501/99; 427/249; 427/294; 427/376.2; 427/397.7
[58] Field of Search ............. 427/249, 294, 376.2, 427/397.7; 501/53, 55, 56, 88, 90, 97, 99

[56] References Cited

U.S. PATENT DOCUMENTS

| | | | |
|---|---|---|---|
| 3,591,243 | 7/1971 | Knippenberg et al. | 308/241 |
| 3,634,116 | 1/1972 | Woerner et al. | 117/106 C |
| 4,221,831 | 9/1980 | Kostikov et al. | 427/314 |
| 4,420,539 | 12/1983 | Kostikor et al. | 427/294 X |
| 4,517,037 | 5/1985 | Francis et al. | 501/97 X |
| 4,741,925 | 5/1988 | Chaudhuri et al. | 427/294 X |

FOREIGN PATENT DOCUMENTS 54-28311 3/1979 Japan .
59-3907 1/1984 Japan .
1118056 6/1968 United Kingdom .
2122179 1/1984 United Kingdom .

OTHER PUBLICATIONS

T. E. Schmid, R. J. Hecht, "High Technology Ceramic Coatings-Current Limitations/Future Needs", Ceram. Eng. Sci. Proc., 9(9-10), pp. 1089-1094 (1988).

Primary Examiner—Michael Lusignan
Attorney, Agent, or Firm—Charles E. Miller

[57] ABSTRACT

A siliconized graphite for use in mechanical seals is provided. This material is prepared by reacting graphite at an elevated temperature ranging from 1800° to 2100° C. with silicon monoxide. Silicon monoxide is generated in rate-controlled fashion by reacting either silicon carbide and silica or silicon nitride and silica at an elevated temperature ranging from 1500° to 1800° C.

Although the optimum temperature range for the SiO generation and the siliconization of graphite is different by 300° C., size-controlled raw materials (silicon carbide, silicon nitride, and silica) and a unique sample loading method make the whole process occurred in situ and make the production of mechanical seals efficient. Size-controlling of the raw materials is essential for a constant supply of silicon monoxide in controlled fashion, and a unique sample loading method is essential to put the SiO generation and the siliconization of graphite within their optimum temperature ranges. The produced materials by this method show excellent properties suitable for use in mechanical seals, rocket nozzles, etc.

8 Claims, 4 Drawing Sheets

MECHANICAL SEALS OF SIC-COATED GRAPHITE BY RATE-CONTROLLED GENERATION OF SIO AND PROCESS THEREFOR

BACKGROUND OF THE INVENTION

1. Field of the Invention

This invention relates to graphite materials with chemically-formed silicon carbide on its surface, which can be used as mechanical seals and a process for producing the same materials.

2. Description of the Prior Art

As compared with bare graphite products, SiC-coated graphite has superior properties such as higher strength, higher hardness, higher abrasion resistance, and higher oxidation resistance. Therefore, it is one of the best useful materials for use in mechanical seals.

There are three major methods for the formation of SiC on graphite: (i) chemical vapor deposition employing organosilicon compounds such as trimethylsilane, (ii) infiltration-reactions employing Si liquid or gas; and (iii) gas-solid reactions employing SiO gas.

U.S. Pat. No. 3,591,243 discloses the bearing elements which consist of coherent pyrolytic silicon carbide formed by Si-carring gas through chemical vapor deposition.

U.K. Patent Specification No. 1,118,056 provides a process for cladding or coating a carbonaceous substrate with silicon carbide. This is accomplished by melting a thin layer of highly pure silicon on carbonaceous substrates, and then by depositing homogeneous silicon carbide over the surface of the substrate.

U.S. Pat. No. 4,221,831 employs molten silicon (Si) as a siliconization agent for porous carbon blank. Impregnation of the carbon blank with molten silicon starts at a temperature ranging from 2100° to 2200° C. for 3 to 5 minutes, followed by transformation to silicon carbide at a temperature ranging from 1800° to 2050° C. for 30 to 40 minutes.

Japanese Patent Publication No. (Sho) 38-16,106 employs a mixture of silicon powder (Si) and silica ($SiO_2$) as a silicon monoxide source for the conversion of graphite to silicon carbide. SiC-coated layer of 0.2–0.5 mm thickness is achieved at a temperature of 1800° to 2300° C. for 150 minutes.

Japanese Laid-Open Patent Publication No. (Sho) 59-3,907 employs a mixture of silica ($SiO_2$) and carbon black (C) as a silicon monoxide source for the conversion of graphite to silicon carbide.

U.S. Pat. No. 3,634,116 teaches silicon monoxide vapor, which is produced by heating silicon powder (Si) and silica ($SiO_2$) to a temperature of at least 1400° C. and reacts with graphite particles of the substrate to form individual silicon carbide casings on the graphite particles.

U.K. Patent Specification No. 2,122,179 concerns a method for forming SiC by the reaction of SiO gas with graphite and a carbon substrate. In this method, SiO gas is generated by reacting $SiO_2$ powder with hydrogen gas within a temperature ranging from 1425° to 1600° C. The layer of SiC has 1.5 mm thickness and a density of 2.6 g/cm$^3$.

Japanese Laid-Open Patent Publication No. (Sho) 54-28,311 discloses a process for making a uniform, SiC-coated graphite. It employs a graphite tube furnace which has a temperature gradient ranging from 300° C. at the entrance to 2000° C. at the center. A graphite crucible having two separated zones is used to generate silicon monoxide and to siliconize the graphite substrate. Silicon monoxide is generated by reacting a mixture of silica or silicon compound and carbon. The yielded products have a uniform SiC-coated layer of about 0.8 mm thickness.

SUMMARY OF THE INVENTION

The primary object of the invention is to provide siliconized graphite for use in mechanical seals. Another object of the invention is to provide a process for producing the siliconized graphite. These and other objects of the invention can be attained by generating silicon monoxide gas and reacting this gas with a graphite article at an elevated temperature.

When a mixture of silicon carbide and silica is reacted under a non-oxidizing atmosphere at an elevated temperature, the following reaction will proceed:

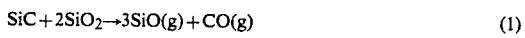

$$SiC + 2SiO_2 \rightarrow 3SiO(g) + CO(g) \qquad (1)$$

When a mixture of silicon nitride reacts with silica under a non-oxidizing atmosphere at an elevated temperature, the following reaction will proceed:

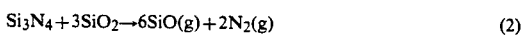

$$Si_3N_4 + 3SiO_2 \rightarrow 6SiO(g) + 2N_2(g) \qquad (2)$$

Thermodynamic calculation shows that the above two Reactions (1) and (2) can proceed under a standard state at a temperature above 1800° C. and 1850° C., respectively. Thermodynamic calculation also shows that both Reactions (1) and (2) are highly endothermic with heat consumption of 330 Kcal/mole and 540 Kcal/mole at 1500° C., respectively.

Like most of solid-solid reactions, the rates of the above two reactions which produce SiO gas heavily depend on the particle sizes of each reactant, and the reaction temperature and atmosphere.

BRIEF DESCRIPTION OF THE DRAWINGS

The present invention will be discussed in greater detail, by way of the accompanying drawings, wherein.

DETAILED DESCRIPTION OF THE INVENTION

Figure 1:
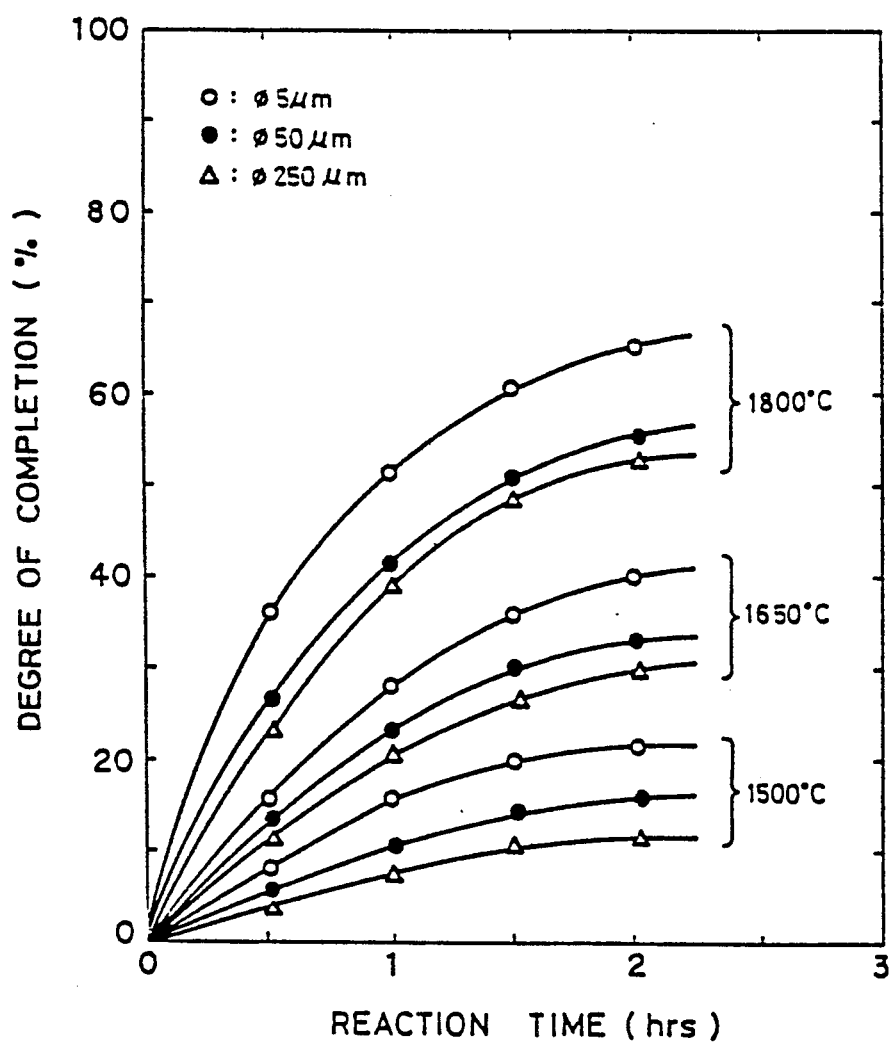
FIG. 1 and 2 show the effects of the temperature and the particle sizes of the reactants on the rates of respective Reactions (1) and (2) when the flow rate of Ar gas is 0.5 l/min.
Figure 2:
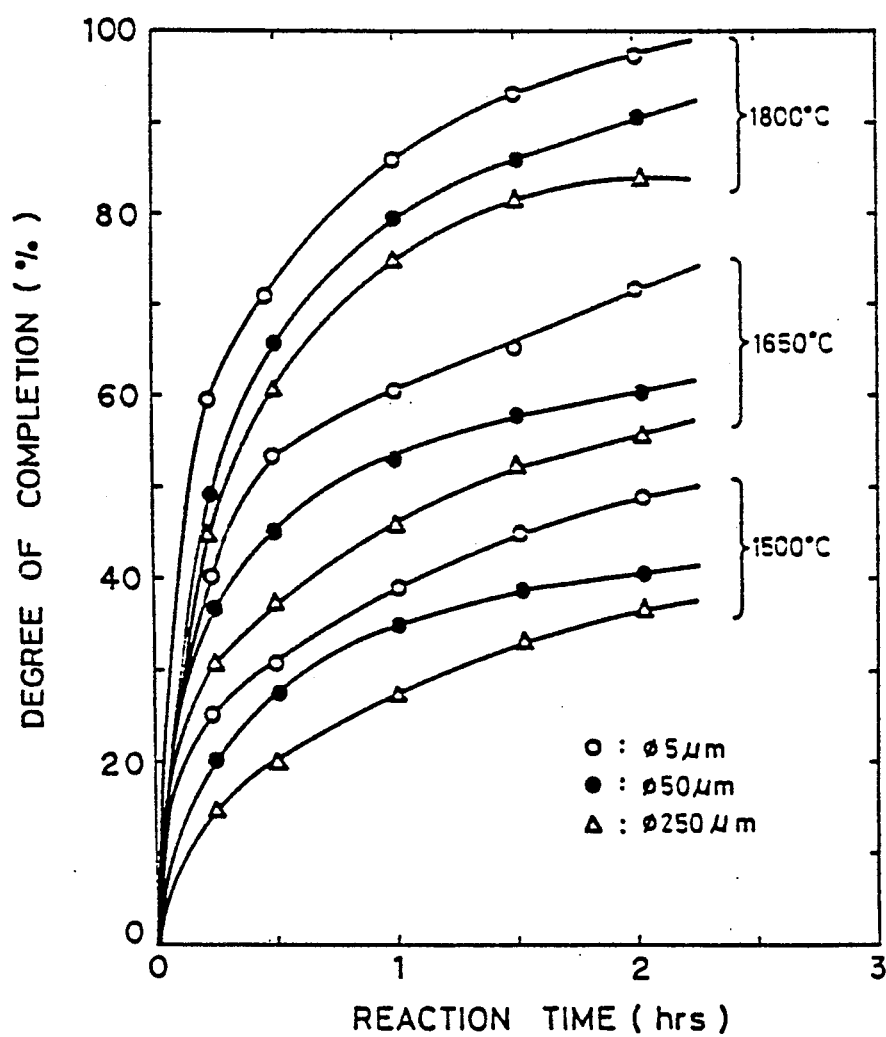

FIG. 1 and FIG. 2 show the effects of the temperature and the particle sizes of reactants on the rates of Reactions (1) and (2), respectively, when the flow rate of Ar gas is 0.5 liter per minute. It is evident that both Reactions (1) and (2) can be speed up by increasing the reaction temperature and by reducing the particle sizes of the reactants. This fact implies that the rate-controlled generation of SiO can be achieved by proper choice of temperatures and proper combinations of particle sizes of the reactants.

When SiO gas and graphite are reacted under a non-oxidizing atmosphere at an elevated temperature, SiC will be formed according to the following reaction:

$$SiO(g) + 2C \rightarrow SiC + CO(g) \qquad (3)$$

Thermodynamic calculation shows that Reaction (3) can proceed under a standard state at a temperature above 1400° C. Thermodynamic calculation also shows that Reaction (3) is highly exothermic with heat release of 20 Kcal/mole at 1500° C., which is quite contrary to Reactions (1) and (2).

As in most of gas-solid reactions, the rate of Reaction (3), which produces solid SiC, strongly depends on the nature of carbon, the reaction temperature, the partial pressures of both SiO and CO, and the catalyst.

Figure 3:
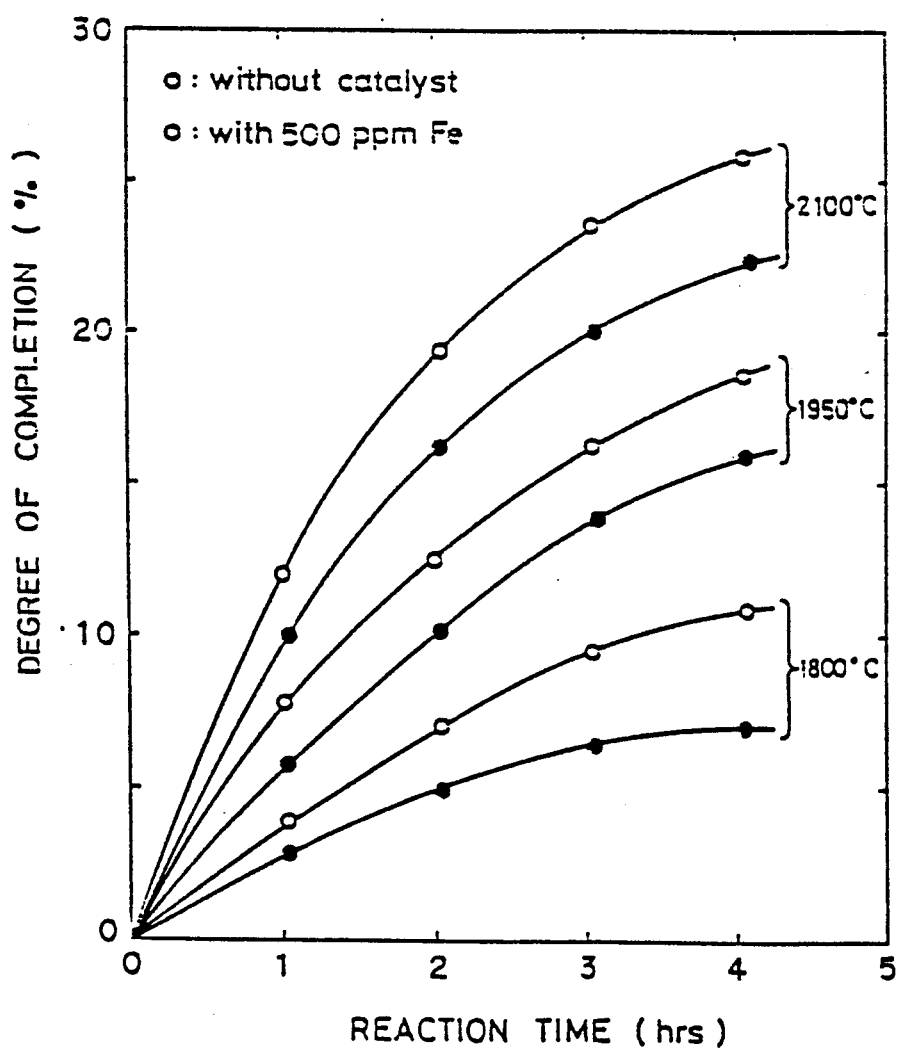
FIG. 3 shows the effects of the temperature and the catalyst, Fe on the rate of Reaction (3) when the flow rate of SiO gas is 0.1 l/min.

FIG. 3 shows the effects of temperature and the catalyst, Fe, on the rate of Reaction (3), when the flow rate of SiO gas is 0.1 liter per minute. It is evident that Reaction (3) can be speed up by increasing the reaction temperature and by addition of the catalyst, Fe. This fact implies that the rate-controlled formation of SiC can be achieved by proper choice of combinations of the temperature and the catalyst.

Microstructural analysis of the SiC formed on graphite (approximately 80% of theortical density) according to Reaction (3) shows that SiC is being formed from the surface of a graphite article and that it corresponds to approximately 90% of theoretical density. This implies that graphite has been converted to SiC and the pores originally existed in the graphite article is sealed up by the newly formed SiC by virtue of a volume increase of 10 to 20% when graphite is converted to SiC. An X-ray diffraction analysis of the SiC formed on graphite according to Reaction (3) shows that SiC has been produced in beta-SiC form.

One way to form a SiC-coated graphite product according to Reactions (1) and (3) is to embed graphite article with a mixture of silicon carbide and silica, both in powder form and reacting the resultant under a non-oxidizing atmosphere at approximately 1500° to 1800° C. A powder mixture of silicon carbide and silica generates SiO gas, which then reacts with a graphite article forming SiC.

Another way to form a SiC-coated graphite product according to Reactions (2) and (3) is to embed a graphite article with a mixture of silicon nitride and silica, both in powder form and reacting the resultant under a non-oxidizing atmosphere at approximately 1500° to 1800° C. A powder mixture of silicon carbide and silica generates SiO gas, which then reacts with a graphite article forming SiC.

However, the above-mentioned two methods have common drawback that they require large amounts of SiO-generating powder since both the SiO-generating powder and the graphite article are under the same temperature and the SiO generation rate is much faster than the SiC forming rate as can be seen from FIG. 1 to FIG. 3. Excessive SiO gas can also escape without reacting with the graphite article.

Induction-heating can provide a great deal of advantages since graphite is easily heated to a high temperature by induction. Furthermore, induction-heating can provide a higher temperature for a graphite article and a lower temperature for embedding powder since only graphite, which is electronically conductive, can be heated by induction, while embedding powder can only be heated indirectly from the graphite article. Further advantages can be recognized that embedding powder acts as heat sink for good insulation since the SiO-generating reactions are highly endothermic.

Figure 4:
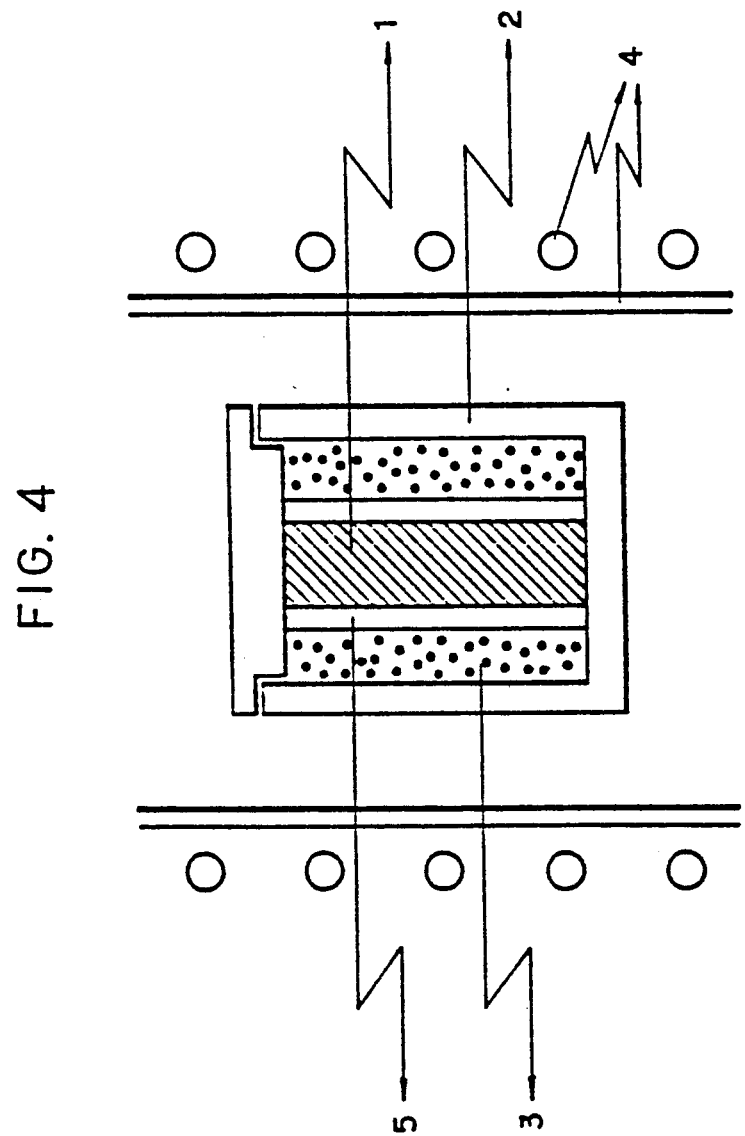
FIG. 4 shows schematically a cross-sectional view of the induction furnace for use in the production of SiC-coated graphite product according to the invention.

FIG. 4 shows the present invention schematically. A graphite article (1) is loaded at the center of a $ZrO_2$ crucible (2). A powder mixture of either SiC and $SiO_2$ or $Si_3N_4$ and $SiO_2$ (3) is poured into the empty space between the inner wall of the $ZrO_2$ crucible and the graphite article. The loaded $ZrO_2$ crucible is placed in the hot zone of an induction furnace (4) which is heated to 2000° C. for 1 hr with a flow of inert gas, and this reaction condition is maintained for 2 to 20 hrs for siliconization of the graphite article.

Measurements show that the average temperature of the embedding powder mixture is 1850° C., which is 150° C. lower than that of the graphite article. Further reduction of the temperature of the embedding powder mixture can be achieved by placing highly insulating materials such as $ZrO_2$ felt between the graphite article (1) and the powder mixture of either SiC and $SiO_2$ or $Si_3N_4$ and $SiO_2$(3). For example, placing 3 mm thickness $ZrO_2$ felt (5) having 75 v/o porosity between the graphite article (1) and the powder mixture of either SiC and $SiO_2$ or $Si_3N_4$ and $SiO_2$ (3) decreases the temperature of the embedding powder mixture to 1650° C.

After cooling the furnace to room temperature, the crucible is removed from the furnace and the siliconized graphite rings are removed out of the same crucible.

PREFERRED EMBODIMENTS OF THE INVENTION

The present invention may be more fully understood from the following examples, which are given by way of illustration and not by way of limitation.

EXAMPLE 1

Ten graphite rings with a size of 30 OD×20 ID×5 mm were loaded at the center of a $ZrO_2$ crucible with a size of 60 OD×50 ID×70 mm. A powder mixture of SiC and $SiO_2$ was prepared by mixing 100 g of SiC and 100 g of $SiO_2$ having a particle size of about 250 microns The powder mixture was poured into the empty space between the inner wall of the $ZrO_2$ crucible and the file of graphite rings. The loaded $ZrO_2$ crucible was placed in the hot zone of the induction furnace having a frequency of 400 KHz and a power capacity of 15 KW.

The furnace was heated to 2000° C. for 1 hr with a flow of Ar gas (0.2 liter per minute) and this reaction condition was maintained for 2 hrs for siliconization of the graphite rings. After cooling the furnace to room temperature, the crucible was removed from the furnace and the siliconized graphite rings were removed out of the crucible.

Analysis shows that 75 wt. % of a SiC-$SiO_2$ mixture was lost by the generation of SiO gas and the SiC layer formed on the graphite rings has an about 0.7 mm thickness and a Shore hardness of about 100.

EXAMPLE 2

Ten graphite rings with a size of 30 OD×20 ID×5 mm were loaded at the center of a $ZrO_2$ crucible with size of 60 OD×50 ID×70 mm. A powder mixture of $Si_3N_4$ and $SiO_2$ was prepared by mixing 100 g of $Si_3N_4$ and 100 g of $SiO_2$ having a particle size of about 250 microns. The powder mixture was poured into the empty space between the inner wall of the $ZrO_2$ crucible and the file of the graphite rings. The loaded $ZrO_2$ crucible was placed in the hot zone of induction furnace having a frequency of 400 KHz and a power capacity of 15 KW.

The furnace was heated to 2000° C. for 1 hr with a flow of Ar gas (0.2 liter per minute) and this reaction condition was maintained for 2 hrs for siliconization of the graphite rings. After cooling the furnace to room temperature, the crucible was removed from the furnace and the siliconized graphite rings were removed out of the crucible.

Analysis shows that 75 wt. % of a $Si_3N_4$—$SiO_2$ mixture was lost by the generation of SiO gas and the SiC layer formed on the graphite rings has an about 0.7 mm thickness and a Shore hardness of about 100.

EXAMPLE 3

Ten graphite rings with a size of 30 OD×20 ID×5 mm were impregnated with an aqueous 5% $FeCl_3 \cdot 6H_2O$ solution, which resulted in the Fe gain of 500 ppm. These rings were placed at the center of a $ZrO_2$ crucible with a size of 60 OD×50 ID×70 mm. A powder mixture of SiC and $SiO_2$ was prepared by mixing 100 g of SiC and 100 g of $SiO_2$ having a particle size of about 250 microns.

The powder mixture was poured into the empty space between the inner wall of the $ZrO_2$ crucible and the file of the graphite rings. The loaded $ZrO_2$ crucible was placed in the hot zone of the induction furnace having a frequency of 400 KHz and a power capacity of 15 KW.

The furnace was heated to 1900° C. for 1 hr with a flow of Ar gas (0.2 liter per minute) and this reaction condition was maintained for 2 hrs for siliconization of the graphite rings. After cooling the furnace to room temperature, the crucible was removed from the furnace and the siliconized graphite rings were removed out of the crucible.

Analysis shows that 75 wt. % of a SiC—$SiO_2$ mixture was lost by the generation of SiO gas and the SiC layer formed on the graphite rings has an about 0.7 mm thickness and a Shore hardness of about 100.

EXAMPLE 4

Fe-impregnated graphite articles obtained from Example 3 were wrapped with $ZrO_2$ felt (3 mm thickness) and loaded at the center of the $ZrO_2$ crucible with a size of 60 OD×50 ID×700 mm. A powder mixture of $Si_3N_4$ and $SiO_2$ was prepared by mixing 50 g of $Si_3N_4$ and 50 g of $SiO_2$ having a particle size of about 250 micron. The powder mixture was poured into the empty space between the inner wall of the $ZrO_2$ crucible and the graphite article. The loaded $ZrO_2$ crucible was placed in the hot zone of induction furnace having a frequency of 400 KHz and a power capacity of 15 KW.

The furnace was heated to 1900° C. for 1 hr with a flow of Ar gas (0.2 liter per minute) and this reaction condition was maintained for 2 hrs for siliconization of the graphite rings. After cooling the furnace to room temperature, the crucible was removed from the furnace and the siliconized graphite articles were removed out of the crucible.

Analysis shows that 75 wt. % of a $Si_3N_4$—$SiO_2$ mixture was lost by the generation of SiO gas and the SiC layer formed on the graphite article has about 0.7 mm thickness and a Shore hardness of about 100.

What is claimed is:

1. A process for manufacturing a siliconized graphite product, which comprises embedding graphite in a powder mixture of about 50 wt. % silicon carbide and about 50 wt. % silica, or about 50 wt. % silicon nitride and about 50 wt. % silica, followed by subjection to an elevated temperature ranging from 1800° C. to 2100° C. under a non-oxidizing atmosphere.

2. A process for manufacturing a siliconized graphite product, which comprises loading graphite at the center of an induction furnace, and loading a powder mixture of about 50 wt. % silicon carbide and about 50 wt. % silica, or about 50 wt. % silicon nitride and about 50 wt. % silica around the graphite, followed by subjection to an elevated temperature ranging from 1800° C. to 2100° C. under a non-oxidizing atmosphere.

3. A process for manufacturing a siliconized graphite product, which comprises loading insulating-felt wrapped graphite at the center of an induction furnace, and loading a powder mixture of about 50 wt. % silicon carbide and about 50 wt. % silica, or about 50 wt. % silicon nitride and about 50 wt. % silica around the graphite, followed by subjection to an elevated temperature ranging from 1800° C. to 2100° C. under a non-oxidizing atmosphere.

4. A siliconized graphite product prepared according to any one of claim 1 to 3.

5. A process for manufacturing a siliconized graphite product, which comprises embedding graphite in a powder mixture of 45-55 wt. % silicon carbide and 55-45 wt. % silica, or 45-55 wt. % silicon nitride and 55-45 wt. % silica, followed by subjection to an elevated temperature ranging from 1800° C. to 2100° C. under a non-oxidizing atmosphere.

6. A process for manufacturing a siliconized graphite product, which comprises loading graphite at the center of an induction furnace, and loading a powder mixture of 45-55 wt. % silicon carbide and 55-45 wt. % silica, or 45-55 wt. % silicon nitride and 55-45 wt. % silica around the graphite, followed by subjection to an elevated temperature ranging from 1800° C. to 2100° C. under a non-oxidizing atmosphere.

7. A process for manufacturing a siliconized graphite product, which comprises loading insulating-felt wrapped graphite at the center of an induction furnace, and loading a powder mixture ob 45-55 wt. % silicon carbide and 55-45 wt. % silica, or 45-55 wt. % silicon nitride and 55-45 wt. % silica around the graphite, followed by subjection to an elevated temperature ranging from 1800° C. to 2100° C. under a non-oxidizing atmosphere.

8. A siliconized graphite product prepared according to any one of claims 5 to 7.

* * * * *

UNITED STATES PATENT AND TRADEMARK OFFICE
CERTIFICATE OF CORRECTION

PATENT NO. : 5,017,527

DATED : May 21, 1991

INVENTOR(S) : June-Gunn Lee; Chang-Sam Kim; Heon-Jin Choi; Seong-Hoon Park

It is certified that error appears in the above-identified patent and that said Letters Patent is hereby corrected as shown below:

On the title page:

Under United States Patent [19], please change "June-Gunn et al." to

-- Lee et al. --

In [75] Inventors, please change - "Lee June-Gunn; Kim Chang-Sam; Choi Heon-Jin; Park Seong-Hoon" to -- June-Gunn Lee; Chang-Sam Kim; Heon-Jin Choi; Seong-Hoon Park --

Signed and Sealed this

Twenty-sixth Day of November, 1991

*Attest:*

HARRY F. MANBECK, JR.

*Attesting Officer*     *Commissioner of Patents and Trademarks*